(12) United States Patent
Hagshenas et al.

(10) Patent No.: US 10,082,243 B1
(45) Date of Patent: Sep. 25, 2018

(54) METHOD AND SYSTEM FOR INLET BLOCKAGE DETECTION

(71) Applicant: PRATT & WHITNEY CANADA CORP., Longueuil (CA)

(72) Inventors: Behzad Hagshenas, San Diego, CA (US); Eric Huff, Saint-Lambert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/621,185

(22) Filed: Jun. 13, 2017

(51) Int. Cl.
| | |
|---|---|
| *G08B 23/00* | (2006.01) |
| *F16N 29/04* | (2006.01) |
| *G01K 3/00* | (2006.01) |
| *F16N 29/00* | (2006.01) |
| *F01D 25/18* | (2006.01) |

(52) U.S. Cl.
CPC .............. *F16N 29/04* (2013.01); *G01K 3/005* (2013.01); *F01D 25/18* (2013.01); *F16N 29/00* (2013.01); *F16N 2210/02* (2013.01); *F16N 2250/08* (2013.01); *F16N 2250/11* (2013.01); *F16N 2260/05* (2013.01); *F16N 2260/06* (2013.01)

(58) Field of Classification Search
None
See application file for complete search history.

(56) References Cited

U.S. PATENT DOCUMENTS

| | | |
|---|---|---|
| 8,850,876 B2 | 10/2014 | Ertz et al. |
| 9,437,054 B2 | 9/2016 | Catt |
| 2013/0074519 A1 | 3/2013 | Ertz et al. |
| 2014/0020460 A1* | 1/2014 | Ertz ................. F01D 21/12 73/114.55 |
| 2016/0230659 A1 | 8/2016 | Gu et al. |

* cited by examiner

*Primary Examiner* — Thomas McCormack
(74) *Attorney, Agent, or Firm* — Norton Rose Fulbright Canada LLP

(57) ABSTRACT

Herein provided are methods and systems for detecting blockage of an inlet of gas turbine engine. An oil temperature measurement of the engine and an ambient temperature measurement is obtained. The oil temperature measurement is compared to a threshold based on the ambient temperature measurement. Blockage of the inlet of the engine is detected when the oil temperature measurement exceeds the threshold.

18 Claims, 6 Drawing Sheets

METHOD AND SYSTEM FOR INLET BLOCKAGE DETECTION

TECHNICAL FIELD

The present disclosure relates generally to gas turbine engines, and more particularly to inlet blockage detection for gas turbine engines.

BACKGROUND OF THE ART

Engine intakes may become blocked during operation. For example, an engine inlet may become blocked by ice during freezing fog conditions. The inlet may also get blocked by other types of debris such as a plastic bag.

Such blockages may lead to damage caused by the ice or other debris, compressor surge and/or flame out, and/or cabin air contamination of exhaust gases.

As such, there is need for methods and system for inlet blockage detection.

SUMMARY

In one aspect, there is provided a method for detecting blockage of an inlet of a gas turbine engine. The method comprises obtaining an oil temperature measurement of the engine and an ambient temperature measurement, comparing the oil temperature measurement to a threshold based on the ambient temperature measurement, and detecting blockage of the inlet of the engine when the oil temperature measurement exceeds the threshold.

In another aspect, there is provided a system for detecting blockage of an inlet of a gas turbine engine. The system comprises a processing unit and a non-transitory computer-readable memory having stored thereon program instructions. The program instructions are executable by the processing unit for obtaining an oil temperature measurement of the engine and an ambient temperature measurement, comparing the oil temperature measurement to a threshold based on the ambient temperature measurement, and detecting blockage of the inlet of the engine when the oil temperature measurement exceeds the threshold.

In a further aspect, there is provided a computer readable medium having stored thereon program code executable by a processor for detecting blockage of an inlet of a gas turbine engine. The program code comprises instructions for obtaining an oil temperature measurement of the engine and an ambient temperature measurement, comparing the oil temperature measurement to a threshold based on the ambient temperature measurement, and detecting blockage of the inlet of the engine when the oil temperature measurement exceeds the threshold.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1A:
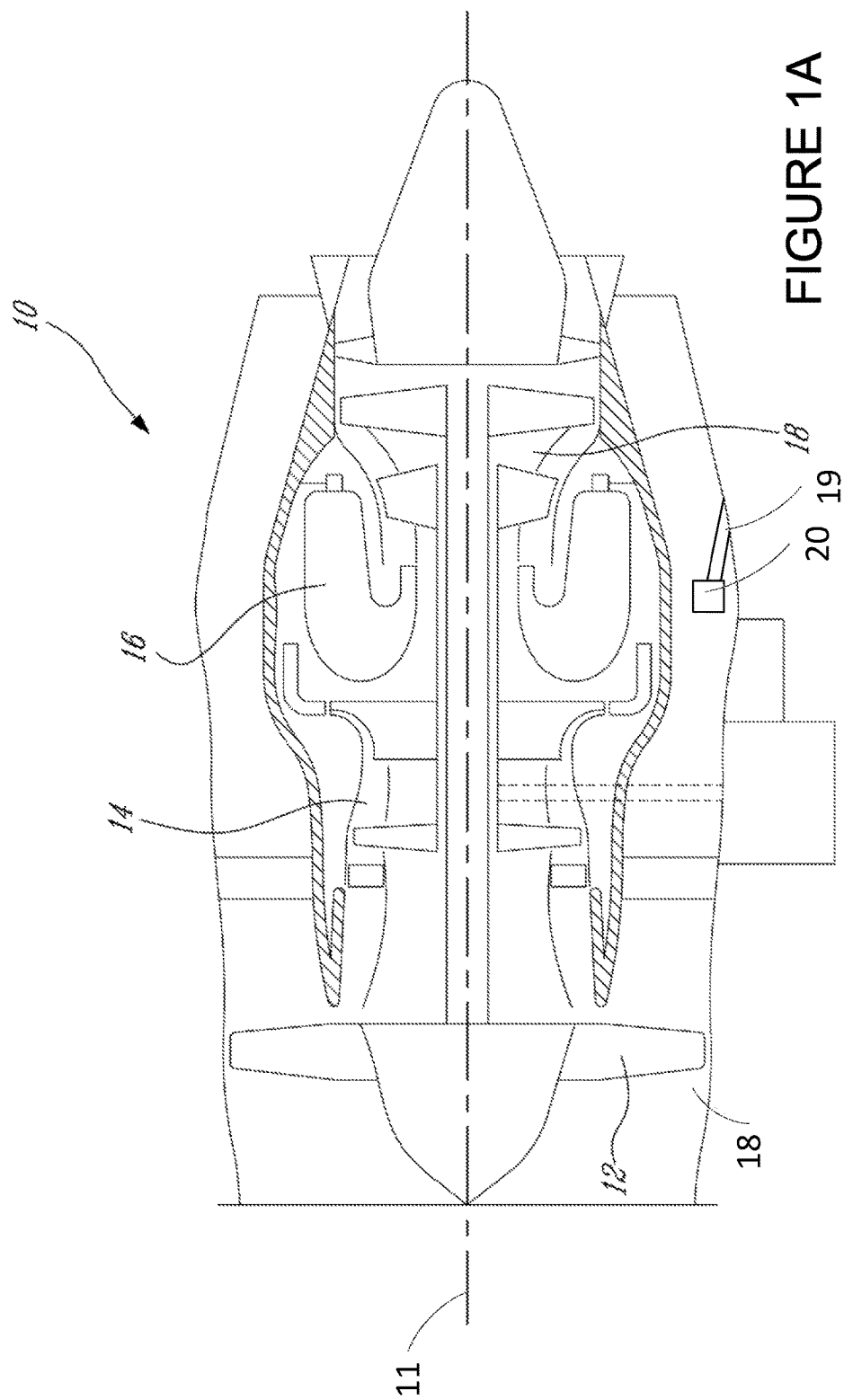
FIG. 1A is a schematic of an example gas turbine engine.

FIG. 1A illustrates a gas turbine engine 10 for which blockage of an inlet may be detected using the methods and systems described herein. The term "inlet" may be referred to as an "intake" and generally refers to an opening for providing air to components of the engine 10. Note that while engine 10 is a turbofan engine, the inlet blockage detection methods and systems may be applicable to turboprop, turboshaft, auxiliary power units (APU), and other types of aircraft engines.

Engine 10 generally comprises in serial flow communication: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Axis 11 defines an axial direction of the engine 10.

In the illustrated embodiment, a primary inlet 18 and an auxiliary inlet 19 are provided for the engine 10. The primary inlet 18 is configured to provide air to the compressor section 14 via the fan 12. The auxiliary inlet 19 is configured to provide air to an oil cooler 20 for cooling oil used in the engine 10.

Figure 1B:
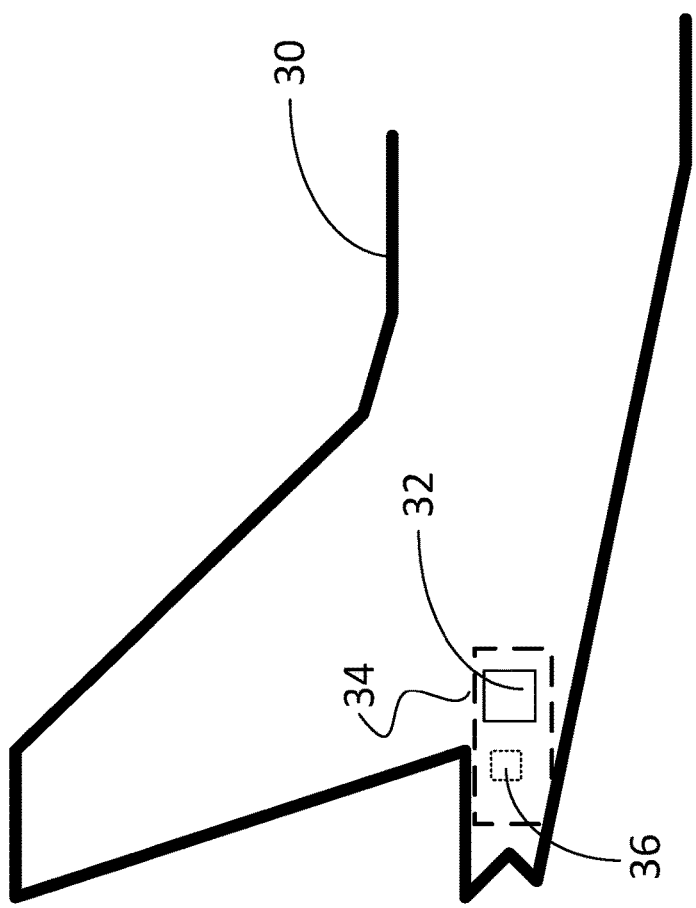
FIG. 1B is schematic example of a tail section of an aircraft having an APU.

With reference to FIG. 1B, in accordance with some embodiments, the inlet blockage detection methods and systems described herein are applied to an APU 34. In the illustrated embodiment, the APU 34 is positioned in a tail section 30 of an aircraft having an APU inlet 32 configured to provide air to a compressor section of the APU and to an oil cooler 36 of the APU 34. Other configurations of the aircraft engine and the inlet are possible.

It is noted that ice accretion on the inlet 32 may increase over time, which typically leads to a reduction of airflow to the oil cooler 36. As a result, a reduction of the heat transfers from the oil of the APU 34 occurs, which leads to higher oil temperature. It is also noted that ambient temperature typically affects engine oil temperature. Accordingly, the oil temperature and ambient temperature may at least in part be used to detect blockage of the inlet 32. Note that the ambient temperature may be the ambient temperature of the engine or the ambient temperature of the aircraft.

Figure 2:
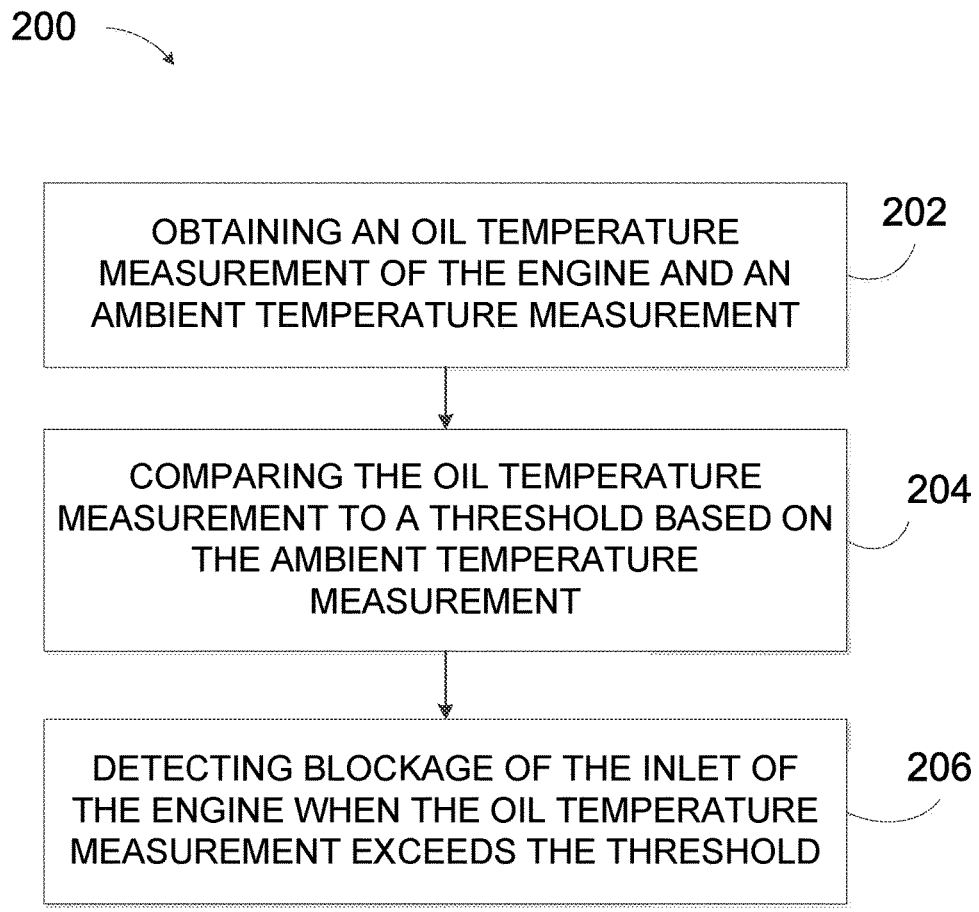
FIG. 2 is a flowchart illustrating an example method for detecting blockage of an inlet to an engine in accordance with an embodiment.

With reference to FIG. 2, there is illustrated a flowchart of an example method 200 for detecting blockage of an inlet of an engine, such as engine 10 of FIG. 1A or the APU 34 of FIG. 1B. While the method 200 is now described herein with reference to the engine 10 of FIG. 1A, this is for example purposes. The method 200 may be applied to other types of engines and/or other types of inlet configurations depending on practical implementations. Method 200 may be performed at regular or irregular time intervals during operation of the engine. In some embodiments, method 200 is performed upon a specific request, for example from a pilot input, from an engine control system, from an aircraft control system, or from any other control system in communication with the engine.

At step 202, an oil temperature measurement of the engine 10 is obtained and an ambient temperature measurement is obtained. The oil temperature measurement may be obtained from an oil temperature measuring device comprising one or more temperature sensors for measuring the oil temperature. The ambient temperature measurement may be obtained from an ambient temperature measuring device comprising one or more temperature sensors for measuring the ambient temperature. The oil temperature and the ambient temperature measurements may be dynamically obtained in real time when needed, or may be recorded regularly in accordance with any predetermined time interval. In some embodiments, the oil temperature and the ambient temperature measurements are obtained via existing components as part of engine control and/or operation. Alternatively, the oil temperature and/or the ambient temperature measurements are simply provided for the purposes of method 200. In some embodiments, the ambient temperature measuring device may be separate from the engine 10 and associated with other components of the aircraft. In some embodiments, step 202 comprises triggering a measurement of oil temperature and/or ambient temperature whenever method 200 is initiated.

At step 204, the oil temperature measurement is compared to a threshold based on the ambient temperature measurement. In accordance with an embodiment, the threshold (T) defines a first range (T1 to T) of oil temperatures below the threshold and a second range (T to T2) of oil temperatures above the threshold. The first range corresponds to the oil temperature of the engine 10 being within an acceptable temperature condition for operation of the engine 10 for a specific ambient temperature or range of ambient temperatures. The second range corresponds to the oil temperature of the engine 10 being in a high temperature condition for a specific ambient temperature or range of ambient temperatures. The high temperature condition generally refers to the oil temperature being outside of the acceptable temperature condition for operation of the engine 10 which may be an indicator that the inlet is blocked.

Figure 3A:
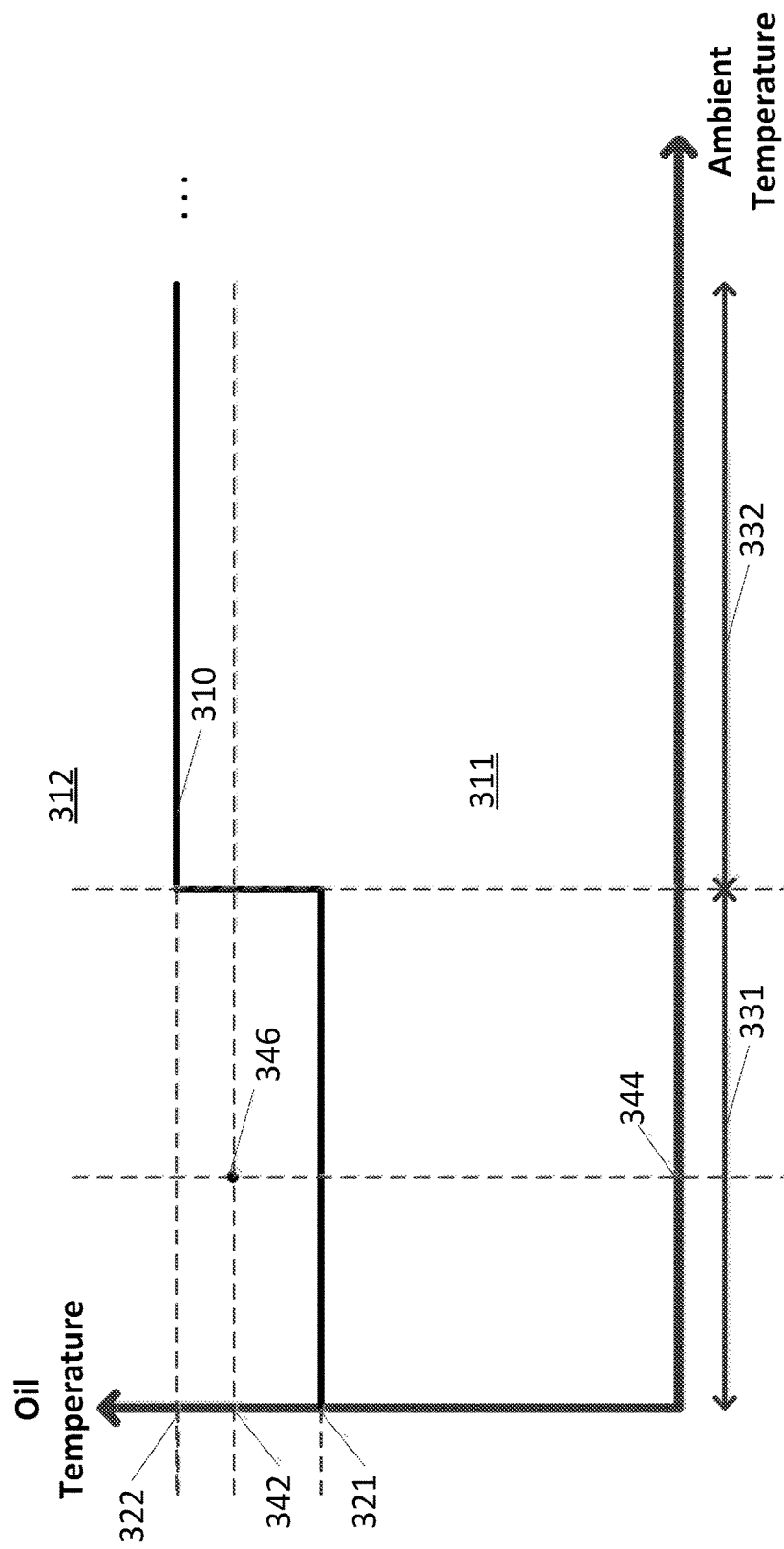
FIG. 3A is an example graphical representation of a first example threshold for detecting blockage of an inlet to an engine.

In accordance with some embodiments, the threshold varies as a function of ambient temperature ranges. With additional reference to FIG. 3A, a first example threshold 310 is illustrated, where the threshold 310 varies as a function of ambient temperature ranges. In FIG. 3A, the x-axis corresponds to ambient temperature and the y-axis corresponds to oil temperature. In the illustrated embodiment, the threshold 310 defines a first region 311 for oil temperatures below the threshold 310 and a second region 312 for oil temperatures above the threshold 310, where the first region 311 corresponds to the oil temperatures being within the acceptable temperature condition and the second region 312 corresponds to the oil temperatures being in the high temperature condition.

In the embodiment illustrated, the threshold 310 is constant at a first value 321 for a first ambient temperature range 331 and the threshold 310 is constant at a second value 322 for a second ambient temperature range 332. As shown, the first value 321 is different from the second value 322. While the threshold 310 is illustrated as being constant for only two values, in other embodiments, the number of constant values may be more than two. Accordingly, the threshold may be constant at a first value for at least a first one of the ambient temperature ranges and the threshold may be constant at a second value for at least a second one of the ambient temperature ranges, the first value being different from the second value. In other words, multiple oil temperature values may be used as a function of ambient temperature for the threshold.

In accordance with some embodiments, the comparison of the oil temperature measurement to the threshold based on the ambient temperature measurement comprises determining a threshold value corresponding with the ambient temperature measurement and comparing the oil temperature measurement to the threshold value.

For example, as shown in FIG. 3A, a first oil temperature measurement 342 and a first ambient temperature measurement 344 are plotted at a first point 346. As shown, the first ambient temperature measurement 344 is within the first ambient temperature range 331. As such, it can be determined that the first value 321 of the threshold 310 should be used as the threshold value for comparing the first oil temperature measurement 342 thereto. As the first oil temperature measurement 342 is above the first value 321, it exceeds the threshold 310.

Figure 3B:
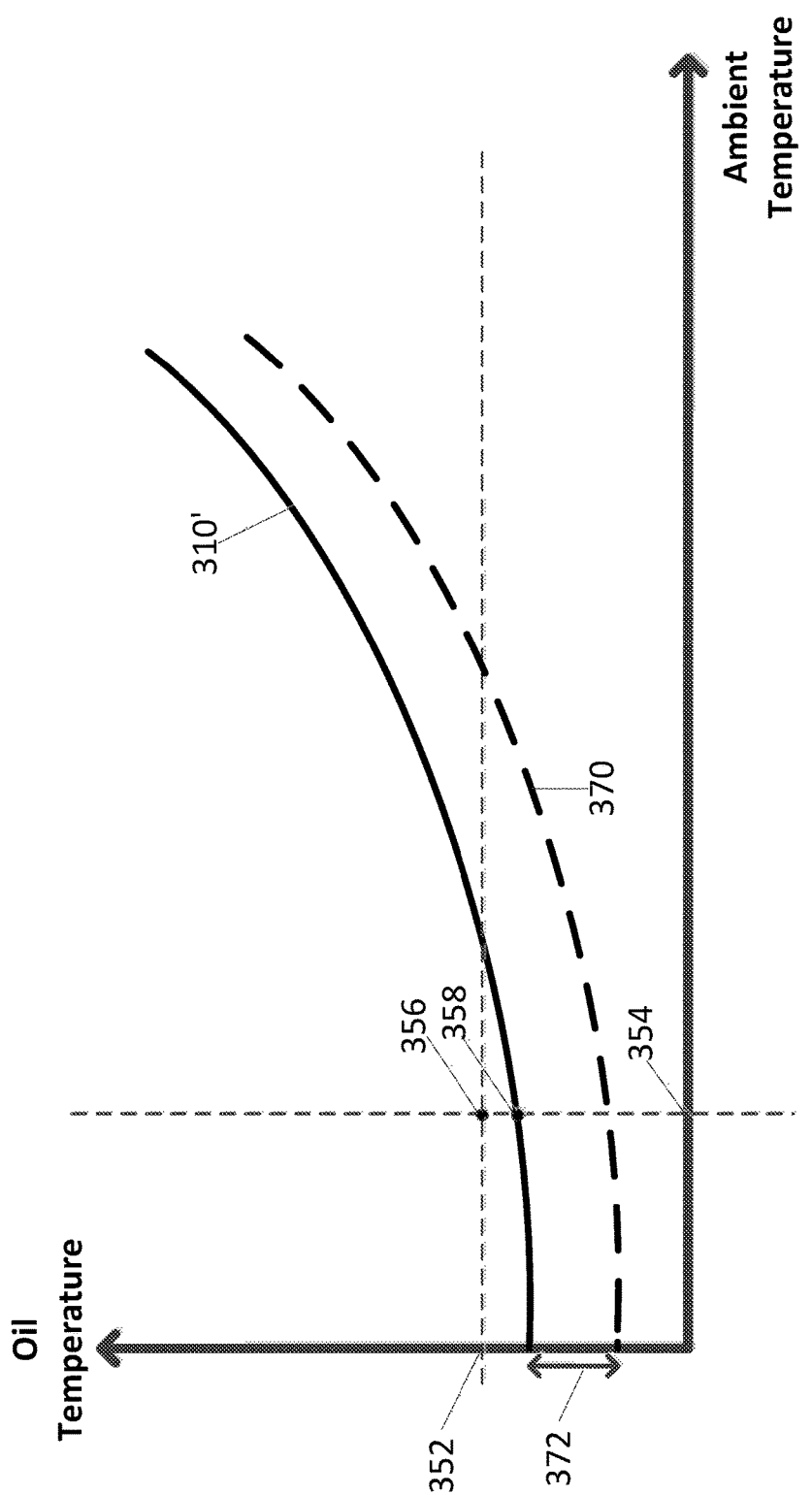
FIG. 3B is an example graphical representation of a second example threshold for detecting blockage of an inlet to an engine.

With reference to FIG. 3B, a second example threshold 310' is illustrated as a curve defining a relationship between oil temperature and ambient temperature. In accordance with an embodiment, determining the threshold value comprises locating the threshold value using the curve. As shown, a second oil temperature measurement 352 and a second ambient temperature measurement 354 are plotted at a second point 356. The second ambient temperature measurement 354 is used to determined that an example threshold value 358 should be used for comparing the second oil temperature measurement 352 thereto. As the second oil temperature measurement 356 is above the example threshold value 358 it exceeds the threshold 310'.

It is noted that the threshold 310 or 310' may be designed based on measurements and/or simulation of the engine 10. For example, as shown in FIG. 3B, an oil temperature curve 370 as a function of ambient temperature illustrates an expected oil temperate of the engine 10 as a function of ambient temperature without blockage of the inlet 19 of the engine 10. The curve 370 may be obtained by measurements and/or simulation of the engine 10. Accordingly, the threshold 310' may be designed by offsetting the curve 370 by an offset value 372.

While in the illustrated embodiments, the thresholds 310, 310' are obtained from a curve, in other embodiments, the thresholds 310, 310' may be determined from an equation, a look-up table and/or any other suitable technique.

Referring back to FIG. 2, at step 206, blockage of the inlet 19 of the engine 10 is detected when the oil temperature measurement exceeds the threshold. For example, with reference to FIG. 3A, blockage of the inlet 19 of the engine 10 would be detected as the first oil temperature measurement 342 is shown to exceed the first example threshold 310 for the corresponding first ambient temperature measurement 344. Similarly, with reference to FIG. 3B, in this example, blockage of the inlet 19 of the engine 10 would be detected as the second oil temperature measurement 352 is shown to exceed the second example threshold 310' for the corresponding second ambient temperature measurement 354.

The detection of the blockage may be used as prognostic, diagnostic or shutdown of the engine 10. For example, detecting blockage of the inlet 19 may comprise sending an alert indicating blockage of the inlet 19. The alert may be sent to an aircraft command system which may then indicate to a pilot and/or other crew member that the inlet 19 is blocked. The pilot and/or other crew member may take a corrective action such as shutting down the engine 10 and/or crew members may clear the blockage (e.g., ice) from the inlet 19.

In some embodiment, the method 200 further comprises shutting down the engine 10 automatically, in response to detecting blockage of the inlet 19 of the engine 10. This may be done, for example, by cutting the fuel flow to the engine 10 or using any other shutdown mechanisms.

In accordance with some embodiments, detecting blockage of the inlet may further comprise determining that blockage of the inlet is caused by closure of an inlet door when a sensor for measuring the position of the inlet door is unresponsive. For example, the APU inlet 32 of FIG. 1B may have an inlet door that is controllable. If the sensor for measuring the position of the inlet door fails, the method 200 may be used to detect failure of the control mechanism of the inlet door, when the method 200 detects blockage of the APU inlet 32.

It should be appreciated that the oil temperature measurement is being used as an indicator for something other than just determining that the oil of the engine 10 is hot, namely, detecting blockage of an inlet.

Figure 4:
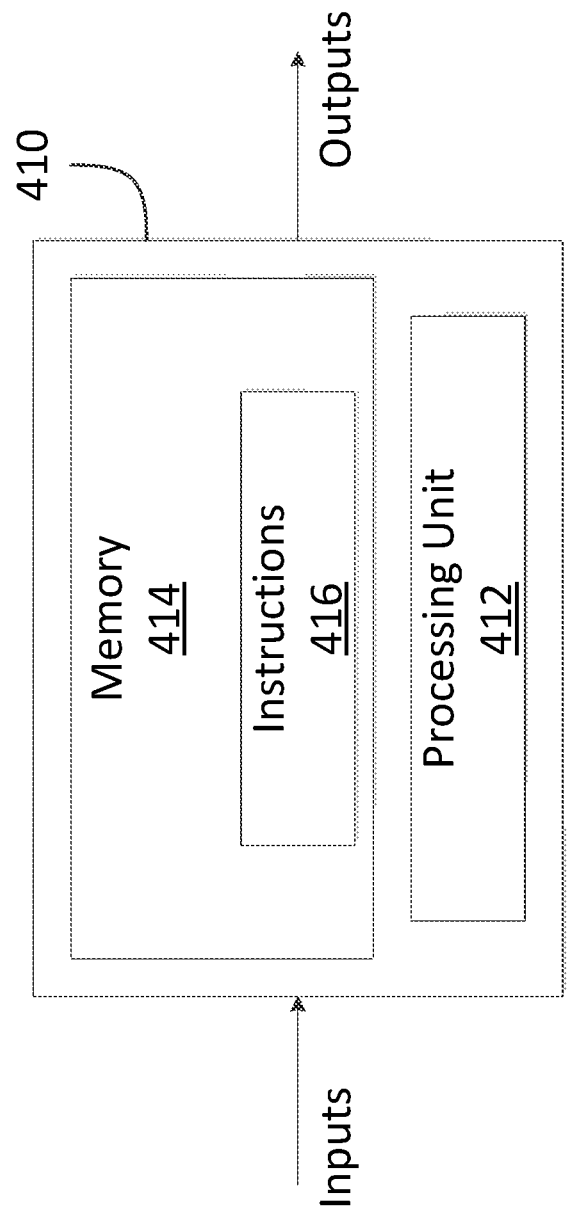
FIG. 4 is a block diagram of an example computing device for implementing the method of FIG. 2.

The method 200 may be implemented by a control system. With reference to FIG. 4, the control system may be implemented by a computing device 410, comprising a processing unit 412 and a memory 414 which has stored therein computer-executable instructions 416. The processing unit 412 may comprise any suitable devices configured to implement the method 200 such that instructions 416, when executed by the computing device 410 or other programmable apparatus, may cause the functions/acts/steps performed as part of the method 200 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. Note that the control system can be implemented as part of a full-authority digital engine controls (FADEC) or other similar device, including electronic engine control (EEC), engine control unit (EUC), and the like.

The methods and systems for detecting inlet blockage of an engine described herein may be implemented in a high level procedural or object oriented programming or scripting language, or a combination thereof, to communicate with or assist in the operation of a computer system, for example the computing device 410. Alternatively, the methods and systems for detecting inlet blockage of an engine may be implemented in assembly or machine language. The language may be a compiled or interpreted language. Program code for implementing the methods and systems for detecting inlet blockage of an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting inlet blockage of an engine may also be considered to be implemented by way of a non-transitory computer-readable storage medium having a computer program stored thereon. The computer program may comprise computer-readable instructions which cause a computer, or more specifically the processing unit 412 of the computing device 410, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for detecting inlet blockage of an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A computer-implemented method for detecting blockage of an inlet of a gas turbine engine, the method comprising:
    obtaining an oil temperature measurement of the engine from at least one first temperature sensor and an ambient temperature measurement from at least one second temperature sensor;
    comparing the oil temperature measurement to a threshold based on the ambient temperature measurement;
    detecting blockage of the inlet of the engine when the oil temperature measurement exceeds the threshold; and
    in response to detecting blockage of the inlet, outputting an alert indicating blockage of the inlet to an aircraft system or shutting down the engine.

2. The method of claim 1, wherein the threshold varies as a function of ambient temperature ranges.

3. The method of claim 2, wherein the threshold is constant at a first value for at least a first one of the ambient temperature ranges.

4. The method of claim 3, wherein the threshold is constant at a second value for at least a second one of the ambient temperature ranges, the first value being different from the second value.

5. The method of claim 1, wherein comparing the oil temperature measurement to the threshold based on the ambient temperature measurement comprises determining a threshold value corresponding with the ambient temperature measurement and comparing the oil temperature measurement to the threshold value.

6. The method of claim 5, wherein the threshold comprises a curve defining a relationship between oil temperature and ambient temperature and wherein determining the threshold value comprises locating the threshold value on the curve.

7. The method of claim 1, wherein the engine is an auxiliary power unit and the inlet provides air to an oil cooler of the auxiliary power unit.

8. The method of claim 1, wherein the inlet is an auxiliary inlet of the engine and the auxiliary inlet provides air to an oil cooler of the engine.

9. A system for detecting blockage of an inlet of a gas turbine engine, the system comprising:
   a processing unit; and
   a non-transitory computer-readable memory having stored thereon program instructions executable by the processing unit for:
      obtaining an oil temperature measurement of the engine from at least one first temperature sensor and an ambient temperature measurement from at least one second temperature sensor;
      comparing the oil temperature measurement to a threshold based on the ambient temperature measurement;
      detecting blockage of the inlet of the engine when the oil temperature measurement exceeds the threshold; and
      in response to detecting blockage of the inlet, outputting an alert indicating blockage of the inlet to an aircraft system or shutting down the engine.

10. The system of claim 9, wherein the threshold varies as a function of ambient temperature ranges.

11. The system of claim 10, wherein the threshold is constant at a first value for at least a first one of the ambient temperature ranges.

12. The system of claim 11, wherein the threshold is constant at a second value for at least a second one of the ambient temperature ranges, the first value being different from the second value.

13. The system of claim 9, wherein comparing the oil temperature measurement to the threshold based on the ambient temperature measurement comprises determining a threshold value corresponding with the ambient temperature measurement and comparing the oil temperature measurement to the threshold value.

14. The system of claim 13, wherein the threshold comprises a curve defining a relationship between oil temperature and ambient temperature and wherein determining the threshold value comprises locating the threshold value on the curve.

15. The system of claim 9, wherein the engine is an auxiliary power unit and the inlet provides air to an oil cooler of the auxiliary power unit.

16. The system of claim 9, wherein the inlet is an auxiliary inlet of the engine and the auxiliary inlet provides air to an oil cooler of the engine.

17. A non-transitory computer readable medium having stored thereon program code executable by a processor for detecting blockage of an inlet of a gas turbine engine, the program code comprising instructions for:
   obtaining an oil temperature measurement of the engine from at least one first temperature sensor and an ambient temperature measurement from at least one second temperature sensor;
   comparing the oil temperature measurement to a threshold based on the ambient temperature measurement;
   detecting blockage of the inlet of the engine when the oil temperature measurement exceeds the threshold; and
   in response to detecting blockage of the inlet, outputting an alert indicating blockage of the inlet to an aircraft system or shutting down the engine.

18. The non-transitory computer readable medium of claim 17, wherein comparing the oil temperature measurement to the threshold based on the ambient temperature measurement comprises determining a threshold value corresponding with the ambient temperature measurement and comparing the oil temperature measurement to the threshold value.

* * * * *